United States Patent [19]

Wasserman

[11] Patent Number: 4,491,733
[45] Date of Patent: Jan. 1, 1985

[54] RADIATION FLUX MEASURING SYSTEM WITH DEAD-TIME CORRECTION

[75] Inventor: Philip D. Wasserman, Cupertino, Calif.

[73] Assignee: Xetex, Inc., Mountain View, Calif.

[21] Appl. No.: 313,779

[22] Filed: Oct. 22, 1981

[51] Int. Cl.³ .............................................. G01T 1/18
[52] U.S. Cl. ...................................... 250/374; 250/375
[58] Field of Search ....................... 250/336, 374, 375; 307/597; 328/127, 210

[56] References Cited

U.S. PATENT DOCUMENTS

| 2,633,540 | 3/1953 | Wilson et al. | |
| 3,037,118 | 5/1962 | Bryant. | |
| 3,573,639 | 4/1971 | Metz et al. | |
| 3,814,937 | 6/1974 | Lowes | 250/336 |
| 3,984,690 | 10/1976 | Marshall et al. | 250/374 |
| 4,090,082 | 5/1978 | Marshall et al. | 250/375 |
| 4,292,539 | 9/1981 | Todd | 250/374 |

OTHER PUBLICATIONS

Taylor, "Dead-Time Correction in Nucleonic Counter Systems", *Control*, (British Publication), vol. 12, No. 124, Oct. 1968, pp. 862–863.
Todd, "Compensated Count Rate Circuit for Portable Geiger–Muller Survey Meter", *Rev. Sci. Instrum.*, vol. 51, No. 8, Aug. 1980, pp. 1132–1134.

*Primary Examiner*—Janice A. Howell
*Attorney, Agent, or Firm*—Majestic, Gallagher, Parsons & Siebert

[57] ABSTRACT

A radiation level measuring system having a Geiger-Muller gas ionizing tube as a detector. The inherent dead-time of the Geiger-Muller tube that follows a discharge pulse is compensated by the pulse counting electronic measuring circuit. A signal pulse of varying duration is formed from the detector output pulses in a manner that corrects for this dead-time. Measurement of this generated signal pulse duration give the actual radiation level that would be measured if the detector dead-time did not exist.

13 Claims, 4 Drawing Figures

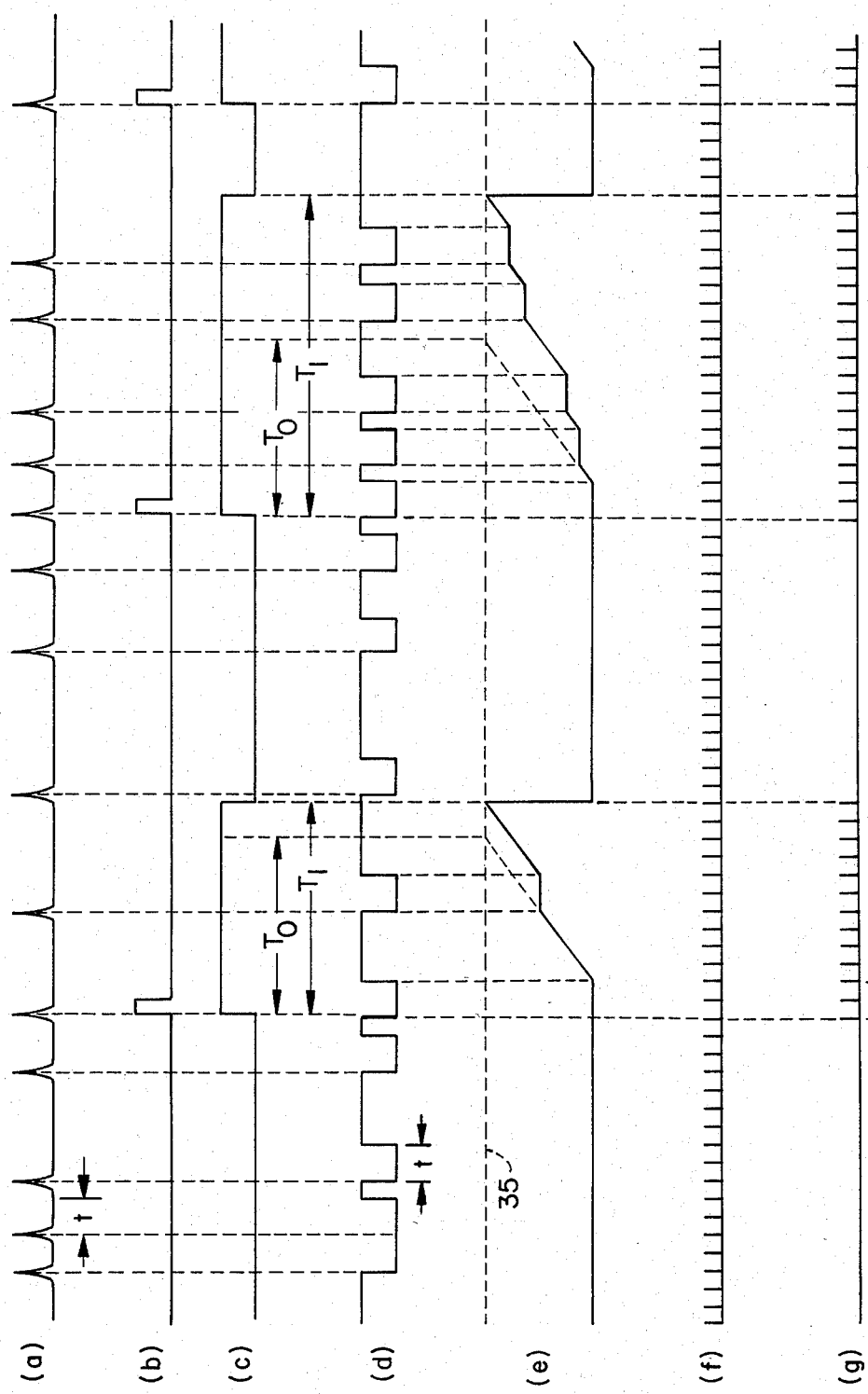
FIG._2.

RADIATION FLUX MEASURING SYSTEM WITH DEAD-TIME CORRECTION

BACKGROUND OF THE INVENTION

This invention is related generally to the art of measuring levels of electromagnetic radiation, such as nuclear (alpha and beta rays) and X-radiation (gamma rays), and more specifically relates to techniques for compensating for the dead-time of ionization type detectors.

One such detector that is widely used in radiation rate and dose measurement instruments is the Geiger-Muller tube. Such tubes contain a pair of spaced apart electrodes within an envelope that contains a gas which breaks down or ionizes after receiving a threshold level of nuclear or similar types of radiation. The ionization causes an instantaneous pulse to be generated by the tube, and it is the practice for rate and dose measuring instruments to count these pulses in some manner as an indication of the radiation level. One source of error in such instruments is a dead-time that exists in the Geiger-Muller tube immediately following the pulse generating ionization. That is, if enough radiation is present to ionize the gas within the tube an instant after the pulse is generated, the tube will not respond and that radiation indicating pulse is lost.

Therefore, it is a principal object of the present invention to provide a technique using such detectors that corrects the measurement for the detector dead-time.

It is another object of the present invention to provide a digital measuring circuit that is easily calibritible.

SUMMARY OF THE INVENTION

These and additional objects are accomplished by the present invention wherein, according to one aspect, the dead-time characteristic of the Geiger-Muller tube and similar types of detectors is compensated by the electronic measuring curcuit that receives the tube output pulses. The actual pulses are not themselves counted but rather they are used to generate a longer duration pulse. The duration of this pulse is proportional to the corrected measurement desired. A signal pulse having a preset duration is first generated in response to the detector output pulses and the existence of any detector pulses during the time of this signal pulse are caused to extend the duration of the signal pulse by an increment that is usually made to be equal to the duration of the detector's dead-time. This technique is particularly advantageous for a dosimeter, wherein the duration of the signal pulses over a period of time are added together to give a measurement of the actual radiation dose received by the detector during that period of time, and is also of advantage in a ratemeter, wherein the duration of the signal pulses over a predetermined short period of time are accumulated.

According to another aspect of the present invention, this technique is implemented by an analog circuit utilizing two retriggerable one-shot multivibrators, one of which generates the desired signal pulse and the other of which cooperates with the first to adjust its duration in response to the detector output pulses. According to another aspect of the present invention, the same result is achieved by a digital circuit utilizing a counter that is incremented by an independent clock oscillator with a logic circuit connected to block clock pulses in order to lengthen the duration of the counter's output signal pulse.

In either of the analog or digital implementations, according to another aspect of the present invention, an improved digital technique for measuring the duration of pulses is employed wherein an independent pulse generator is gated to an accumulating counter with the signal pulse operating the gate. The pulse generator has a fixed frequency but is adjustable over a certain range for calibrating the instrument.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 2 is a timing diagram for the circuit of FIG. 1;

DESCRIPTION OF THE PREFERRED EMBODIMENTS

In each of the analog and digital examples of implementations utilizing the various aspects of the present invention, a radiation detector 11 provides an output 13 in the form of pulses in a number proportional to the amount of radiation present at the detector. The detector 11 is of a type where nuclear radiation or X-radiation ionizes gas within the detector and causes a breakdown which results in a pulse being generated. The most common type of such a detector is the Geiger-Muller counter. It is with this type of detector that the previously described dead-time exists for a period immediately after a pulse is generated.

Figure 1:
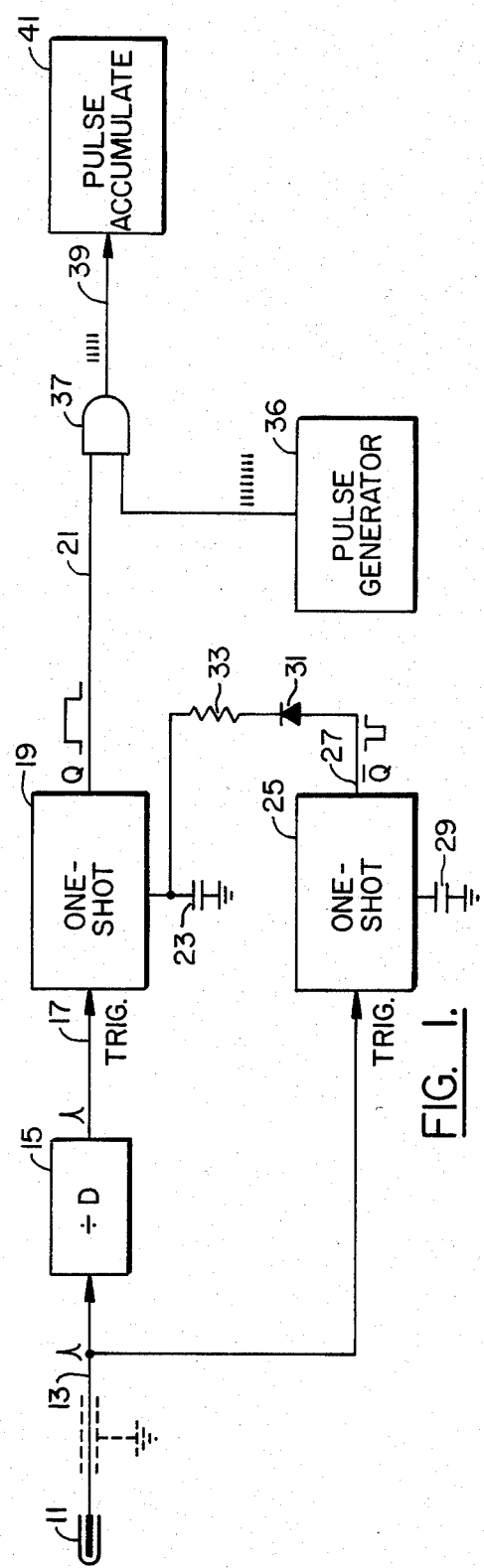
FIG. 1 is a block circuit diagram of one embodiment of the present invention.
Figure 3:
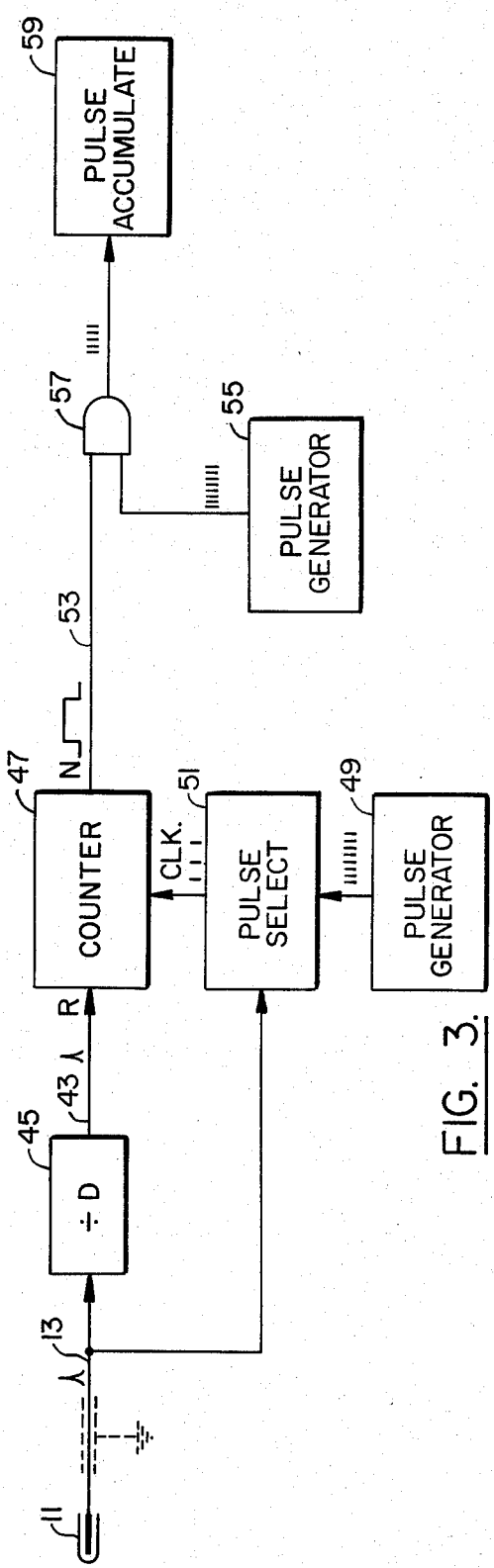
FIG. 3 is a block circuit diagram of another embodiment of the present invention.

In both the analog and digital examples described with respect to FIGS. 1 and 3, respectively, the electronic circuit that receives the detector tube output pulses uses those pulses to create a controlled signal pulse whose width is proportional to the level of radiation in the environment in which the detector is placed. The pulses themselves are not directly counted. The circuits compensate for a detector dead-time "t" that occurs after each actual pulse of the detector.

Referring to FIG. 1, an analog circuit embodiment is shown. The output pulses of the detector 11 are applied to a digital divider 15, whose purpose is described below, and after D pulses are received from the detector, it emits a pulse in a circuit 17. The pulses in the circuit 17 are connected to trigger a retriggerable one-shot multi-vibrator 19, generating an output pulse in a circuit 21. Such an output pulse is initiated each time there is a triggering pulse in the circuit 17. An external capacitor 23 connected to the one-shot 19 determines the normal duration of the output pulse in the circuit 21.

A second retriggerable one-shot multivibrator 25 initiates a negative going output pulse in a circuit 27 each time there is an actual pulse in the line 13 generated by the detector 11. An external capacitor 29 determines the duration of each output pulse of the one-shot 25. The output circuit 27 is connected through a diode 31 and resistor 33 in series to one side of the capacitor 23 that is connected to the one-shot 19. By affecting the way in which the capacitor 23 is charged by the one-shot circuit 19, the one-shot circuit 25 controls the duration of the output pulse of the one-shot 19 in the circuit 21, as can be seen from the timing diagram of FIG. 2.

FIG. 2(a) shows a hypothetical string of detector output pulses in the circuit 13. The interval "t" is indicated to be the dead-time of the detector which follows each pulse. The output of the dividing circuit 15 is shown in FIG. 2(b). For this example, the dividing factor D is set equal to 5. FIG. 2(c) shows the output pulse in the circuit 21 from the one-shot 19. Each such output pulse is initiated by a pulse of FIG. 2(b) and extends a natural duration $T_0$ that is timed out by a circuit of which the external capacitor 23 is a part. The actual pulse duration $T_1$ is longer than that natural period $T_0$ if a pulse is generated in the circuit 13 during the time of the pulse in the circuit 21 and shown in FIG. 2(c).

FIG. 2(d) shows the output of the one-shot 25 in the circuit 27. A negative going pulse is initiated in the circuit 27 by each detector output pulse in the circuit 13. The duration of each such pulse is set to be equal to the dead-time t by a proper selection of the value of capacitor 29. FIG. 2(e) shows the voltage across the capacitor 23 of the one-shot 19. The voltage across the capacitor 23 would normally rise after the one-shot 19 is triggered until that voltage reaches a level 35, wherein the one-shot output pulse is terminated and the capacitor 23 rapidly discharged. The natural timed period $T_0$ provided by the value of the capacitor 23 is altered in the circuit of FIG. 1, however, by the output circuit 27 of the second one-shot 25 being connected to it. As can be seen from FIGS. 2(d) and 2(e), the voltage across capacitor 23 is not increased during the existence of the negative going pulses in the output 27 and charging of that capacitor is stopped for the duration of the FIG. 2(d) negative going pulse output of the one-shot 25.

The resulting duration of the positive going FIG. 3 pulse output in the circuit 21 is then measured as an indication of actual radiation to which the detector 11 is being exposed. An oscillator 36 generates pulses at a constant frequency which are applied to one input of an AND-gate 37 whose output in a line 39 is the pulse output of the oscillator 36 that occurs simultaneously with the output pulse of FIG. 2(c) in the circuit 21 of FIG. 1. These pulses are then counted by an appropriate counting and display circuit 41 to give a reading of the corrected desired radiation level. FIG. 2(f) shows the output of the oscillator 36 and FIG. 2(g) the output of the AND-gate in the circuit 39. For a dosimeter, the circuits 41 accumulate all of the FIG. 2(g) pulses as an indication of total dose received by the detector 11. It is in a dosimeter that the FIG. 2(c) pulse generation techniques have their greatest advantage, although there is also advantage in a radiation rate meter. In a rate meter, the average rate of FIG. 2(g) pulses per unit time would be indicated by the circuits 41, most conveniently by measuring the pulses over a short period such as one second.

The circuit of FIG. 1 operates according to the following relationship:

$$T_1 = T_0 + mT_1 t \qquad (1)$$

and $$T_1 = T_0/(1 - mt) \qquad (2)$$

where m is the average actual rate of pulses being received from the detector in the circuit 13. As can be seen, the duration of the FIG. 2(c) pulses at the output circuit 21 of FIG. 1, denoted as $T_1$, will go up non-linearly as the rate of actual pulses m goes up. The dead-time t will be constant for any given detector 11. Since the natural duration $T_0$ of the FIG. 2(c) pulse output of the one-shot 19 is also fixed by the value of the capacitor 23, the input pulse rate m is the only variable of equation (2). The circuit operates non-linearly in accordance with equation (2) since the receipt of a pulse or pulses during a FIG. 2(c) signal pulse will extend that duration. Each FIG. 2(a) pulse that occurs at that time, as shown in FIGS. 2(c), 2(d) and 2(e), will extend the period of the FIG. 2(c) pulse by an increment t, thereby increasing the output reading of the circuits 41.

If "n" denotes the average pulse rate output of the AND-gate 37, "$N_0$" the number of output pulses for each input pulse to one-shot 19, and "f" the frequency of the pulse generator 36, $$N_o = T_1 f = \frac{fT_0}{1 - mt} \qquad (3)$$

since $$n = \frac{N_o m}{D}, \qquad (4)$$

then $$n = \left(\frac{fT_0}{D}\right)\left(\frac{m}{1 - mt}\right). \qquad (5)$$

It will be noted that all the terms of equation (5) are constants except m and n.

The circuit of FIG. 1 should have its dividing factor D and its natural one-shot period $T_0$ adjusted relative to the maximum number of pulses expected in the circuit 13 so that fewer than D pulses are received during the extended one-shot output pulse duration $T_1$. This will avoid retriggering of the one-shot 19 before it has been timed out. This is controlled principally by making the factor D large enough. Use of the divider 15 also reduces the frequency at which the one-shot 19 must operate, thus making the choice of components for the circuit much greater. For the same reason, a dividing circuit may be inserted ahead of the one-shot 25 and if this is done the duration of the negative going output pulse in the circuit 27 is made to be an integer times t, wherein the integer is the dividing factor. In any event, the practicalities of the circuit of FIG. 1 will normally result in the pulses being divided down more before the one-shot 19 than the one-shot 25.

In a very specific circuit implementation, a dividing circuit with a dividing factor of 8 is positioned in advance of the one-shot 25. The factor D of the dividing circuit 15 is then made equal to 512. RCA part number CD4040B can be used for this purpose. A Motorola part number MC14538B contains two one-shot multivibrators which can be used for those of 19 and 25 in the circuit of FIG. 1. The capacitor 23 is selected to have a value of 0.1 microfarad and is connected between pins 1 and 2 of the Motorola part, the capacitor 29 having a value of 0.01 microfarad and connected between pins 14 and 15. The resistor 33 is made 100 Kohms.

Figure 4:
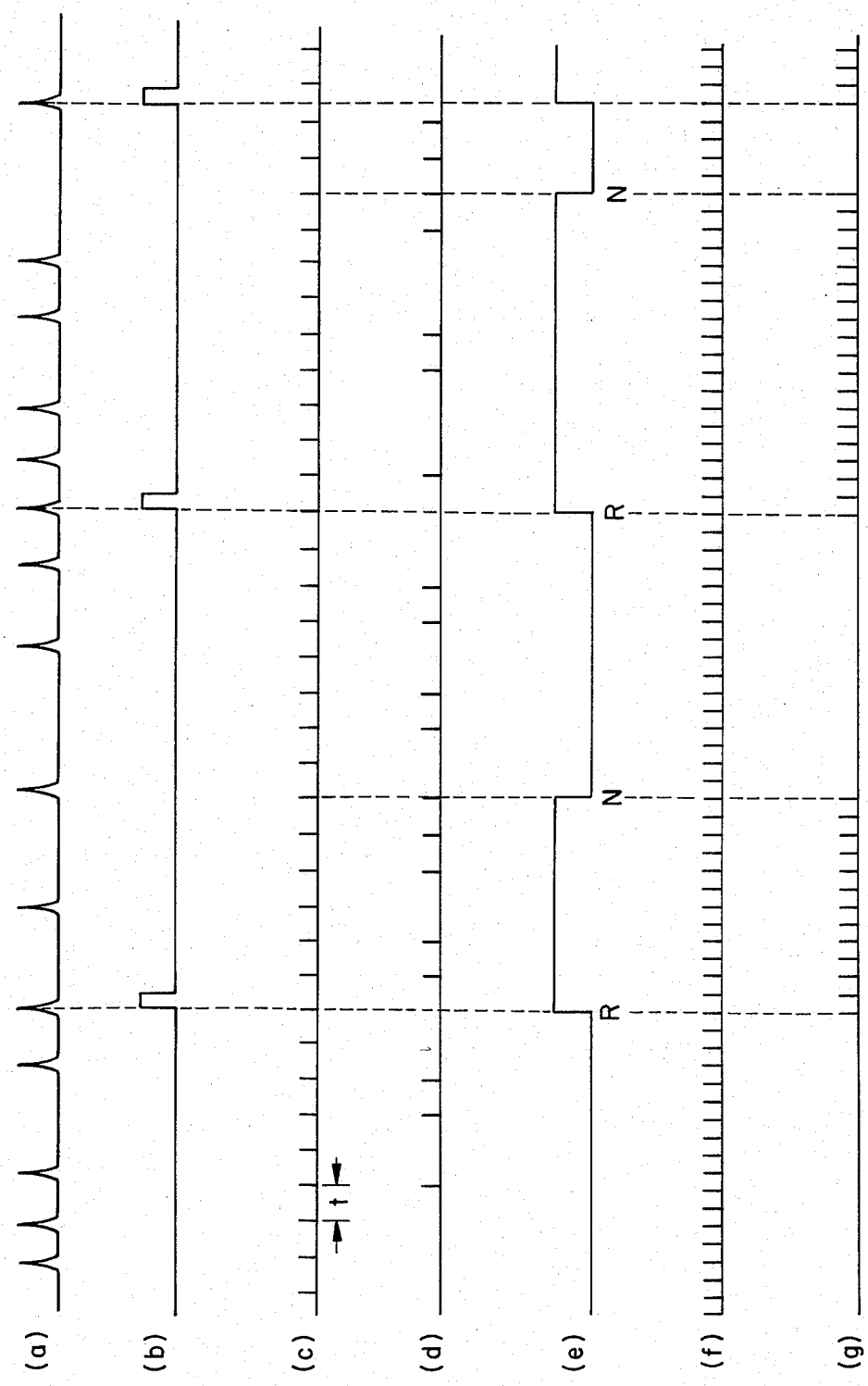
FIG. 4 is a timing diagram for the circuit of FIG. 3.

A digital implementation of the same dead-time correction technique is shown in FIG. 3, its timing diagram being in FIG. 4 wherein the detector output pulses of FIG. 4(a) are the same as FIG. 2(a) to allow the circuits to be compared. The pulses of FIG. 4(b) are shown to be the same as those of FIG. 2(b) at an output 43 of a dividing circuit 45 with D also equal to 5 for purposes of explaining the circuit's operation.

A digital counter 47 of FIG. 3 is incremented by a clock oscillator 49 whose output pulses pass through a pulse selection circuit 51 and then on to the counter 47 to the clock input. An output 53 of the counter 47 carries a signal pulse as shown in FIG. 4(e) that is started with the counter being reset by a pulse in the circuit 43. The pulse is terminated when the counter reaches count N. The duration of such a pulse wound normally be the amount of time taken by N clock pulses of the clock oscillator 49. In the circuit of FIG. 3, however, some of these clock pulses are cancelled by the selection circuit 51. Thus, the time for the counter to reach its count N, and thus the duration of the FIG. 4(e) output pulse in the circuit 53 of FIG. 3, is increased when input pulses occur from the detector in the line 13 while the counter 47 is counting. FIG. 4(c) shows the output of the clock oscillator 49, a series of periodic pulses preferably having the period t. The selection circuit 51, receiving those pulses and the input pulses in the circuit 13, allows only those clock pulses to pass to the counter 47 where there has been no detector pulse in the circuit 13 since the last clock pulse. The output of the selection circuit 51 is shown in FIG. 4(d) and it will be noticed that each time there is an input pulse of FIG. 4(a) there is no pulse of FIG. 4(d).

An independent pulse generator 55 is utilized in connection with an AND-gate 57 whose output is received by a counter and display circuit 59. This part of the circuit operates similarly to the oscillator 36, AND-gate 37 and counter and display circuits 41 of FIG. 1. Use of the oscillator 55 for measuring the duration of the FIG. 4(e) pulses allows its frequency to be adjusted in order to calibrate the read-out circuitry. That is why the oscillator 55 is provided separate from the clock oscillator 49 whose period is fixed to that of the dead-time t of the detector 11. This technique has a significant advantage of making it very easy to calibrate the digital read-out circuit through fine adjustments in the output frequency of the oscillator 55. FIG. 4(f) shows the output of the oscillator 55 and FIG. 4(g) the output of the AND-gate.

It will be noticed that the end result of both of the circuits of FIGS. 1 and 3 is the same when the same series of input pulses of FIGS. 2(a) and 4(a) are assumed. The number of pulses of FIGS. 2(g) and 4(g) are the same and thus the indicated radiation level is the same.

Although the various aspects of the present invention have been described with respect to two specific examples, it will be understood that the invention is entitled to protection within the full scope of the appended claims. For instance, each of the circuits described operate by forming a time "window" of variable duration depending upon the number of pulses received during the window. The duration of the resulting window is an indication of the actual number of pulses that would exist absent the dead-time characteristic of an ionization type of detecting device. This window technique could similarly be utilized with a uniformly varying parameter other than time, such as voltage or frequency.

It is claimed:

1. For a detector which, in response to a certain amount of radiation being received by it, emits an electrical pulse followed by a dead-time period during which the detector is insensitive to radiation, a method of measuring a radiation level received by the detector, comprising the steps of:
   initiating a signal each time a certain predetermined number of detector pulse(s) has occurred, said signal having a preset duration in the absence of any pulses occurring during the existence of the signal;
   extending the signal duration a fixed increment of time for each detector pulse received during the signal, and
   adding the resulting durations of said signals occurring over a period of time, thereby to give an indication of the total radiation received by the detector over that period of time which has been corrected for errors resulting from the detector dead-time periods.

2. A method according to claim 1 wherein the step of extending the signal duration comprises doing so with said fixed increment of time being substantially equal to the detector dead-time period.

3. A method according to either of claims 1 or 2 wherein the step of adding the resulting durations of the signals comprises the step of using said signal to gate the accumulation of constant frequency pulses generated by an adjustable frequency oscillator independent of the foregoing functions, said accumulation occurring only during the signal durations, whereby the indication can be calibrated by adjusting the frequency of said oscillator.

4. A method according to either of claims 1 or 2 wherein the step of initiating a signal comprises making the preset duration and predetermined number of detector pulses such that the extended signal duration is shorter than the time in which a number of pulses equal to said predetermined number is received from said detector.

5. For a detector which, in response to a certain amount of radiation being received by it, emits an electrical pulse followed by a dead-time period during which the detector is insensitive to radiation, a method of measuring a radiation level received by the detector, comprising the steps of:
   marking an initial value of a uniformity changing parameter in response to receiving one or a group of pulses from the detector,
   marking a subsequent parameter value in response to said parameter increasing a preset amount plus a fixed incremental amount for each pulse received between the initial and subsequent markings, and
   adding a change of parameter occurring between the initial and subsequent markings to similar changes occurring previously, thereby to give an indication of the total radiation received by the detector over a period of time during which such parameter changes have been accumulated.

6. The method according to claim 5 wherein said parameter is time.

7. A radiation measurement system, comprising:
   a radiation detector characterized by emitting a train of electrical pulses in an amount proportional to the radiation being received by the detector, a dead-time period following each pulse during which the detector is insensitive to radiation,
   means responsive to said train of detector output pulses for generating a signal having a pre-set duration in the absence of any pulses occurring during the existence of the signal,
   means responsive to said detector output pulses and communicating with said generating means for extending the duration of said signal a fixed increment of time for each detector pulse received during the signal, said fixed increment being substantially equal to the dead-time of the detector, and means receiving said signal from the generating means for accumulating the durations of the signals occurring over a period of time, thereby to give an indication of the total radiation received by the detector over that period of time which has been corrected for errors resulting from the dead-time detector characteristic.

8. The system of claim 7 wherein said pulse duration accumulating means comprises:
a constant frequency pulse generator that is characterized by being adjustable in frequency,
a pulse counter, and
logic means receiving the output of the pulse generator and connected to said generating means for allowing the pulses to increment the counter only during the extended signal duration.

9. The system of claim 7 wherein said generating means includes a first retriggerable one-shot multivibrator having an external timing capacitor of a value to normally emit said signal having the preset duration, and further wherein said extending means comprises a second retriggerable one-shot multivibrator having its output connected to the timing capacitor of the first one-shot multivibrator such that said signal duration is extended by the second one-shot pulse duration each time it is triggered.

10. The system according to claim 7 wherein said generating means includes a digital counter connected to be reset by the detector train of pulses, its output being a signal extending between said reset and the counter reaching a predetermined count, said counter being incremented by an independent clock oscillator, and wherein said extending means includes logic means positioned between said clock oscillator and said counter for blocking one clock pulse for each detector pulse.

11. The system of claim 7 which additionally comprises digital dividing means positioned between the detector and the generating means only every Nth detector pulse, wherein N is an integer.

12. The combination of claim 7 wherein said radiation measurement system is part of a dosimeter instrument.

13. The combination of claim 8 wherein said radiation measurement system is part of a dosimeter instrument.

* * * * *